(12) United States Patent
Shin et al.

(10) Patent No.: US 11,137,345 B2
(45) Date of Patent: Oct. 5, 2021

(54) APPARATUS FOR IMPLEMENTING CONFOCAL IMAGE USING CHROMATIC ABERRATION LENS

(71) Applicant: KOREA PHOTONICS TECHNOLOGY INSTITUTE, Gwangju (KR)

(72) Inventors: In-Hee Shin, Gwangju (KR); Woo-Sub Song, Gwangju (KR); Joo-Beom Eom, Gwangju (KR)

(73) Assignee: KOREA PHOTONICS TECHNOLOGY INSTITUTE, Gwangju (KR)

( * ) Notice: Subject to any disclaimer, the term of this patent is extended or adjusted under 35 U.S.C. 154(b) by 45 days.

(21) Appl. No.: 16/525,928

(22) Filed: Jul. 30, 2019

(65) Prior Publication Data

US 2019/0353585 A1    Nov. 21, 2019

Related U.S. Application Data

(63) Continuation of application No. PCT/KR2018/001641, filed on Feb. 7, 2018.

(30) Foreign Application Priority Data

Feb. 7, 2017 (KR) .................. 10-2017-0016934

(51) Int. Cl.
*G01N 21/27* (2006.01)
*G01N 21/17* (2006.01)

(52) U.S. Cl.
CPC ..... *G01N 21/27* (2013.01); *G01N 2021/1787* (2013.01); *G01N 2201/0866* (2013.01)

(58) Field of Classification Search
CPC ... G01N 2021/1787; G01N 2201/0866; G02B 21/008; G02B 3/0087; G02B 21/0064; G02B 13/0055
See application file for complete search history.

(56) References Cited

U.S. PATENT DOCUMENTS

| 8,427,644 B2* | 4/2013 | Miki ................ G01J 9/00 356/364 |
| 2018/0188515 A1* | 7/2018 | Deng ............ G02B 21/0064 |
| 2019/0162945 A1* | 5/2019 | Hua ................. H04N 5/2353 |

FOREIGN PATENT DOCUMENTS

| KR | 10-1502236 B1 | 3/2015 |
| KR | 10-2015-0059147 A | 5/2015 |
| KR | 10-1750188 B1 | 6/2017 |

(Continued)

OTHER PUBLICATIONS

International Search Report issued in PCT/KR2018/001641; dated Jun. 4, 2018.

*Primary Examiner* — Jonathan M Hansen
(74) *Attorney, Agent, or Firm* — Studebaker & Brackett PC (57) ABSTRACT

The present disclosure relates to a confocal imaging apparatus using a chromatic aberration lens, which is capable of quickly implementing multiple tomographic images by making it possible to quickly scan the entire object without moving the light source or the object. Since the present invention is configured to generate a three-dimensional image using multiple tomographic images by a chromatic aberration lens without moving the light source or the object up and down, there is an effect of remarkably shortening the time it takes to implement the multiple tomographic images.

10 Claims, 7 Drawing Sheets

(56) References Cited

FOREIGN PATENT DOCUMENTS

| KR | 10-1819006 B1 | 1/2018 |
| KR | 10-1890047 B1 | 8/2018 |

\* cited by examiner

Fig. 7

APPARATUS FOR IMPLEMENTING CONFOCAL IMAGE USING CHROMATIC ABERRATION LENS

CROSS-REFERENCE TO RELATED APPLICATIONS

This application is a Continuation of International Application No. PCT/KR2018/001641 filed Feb. 7, 2018, which claims benefit of priority to Korean Patent Application No. 10-2017-0016934 filed Feb. 7, 2017, the entire content of which is incorporated herein by reference.

TECHNICAL FIELD

The present invention relates to a confocal imaging apparatus using a chromatic aberration lens and, more particularly, to a confocal imaging apparatus using a chromatic aberration lens that allows multiple tomographic images to be acquired quickly without moving a light source or an object up and down.

BACKGROUND ART

In general, the confocal imaging technique is a technique in which a pin hole is placed behind an objective lens so that only light starting from one point of the sample passes through the pin hole. It is possible to obtain a two-dimensional or three-dimensional image by continuously measuring neighboring points at time intervals and detecting and then visualizing the same using a photodetector, because only one point is seen at a time.

Figure 1A:
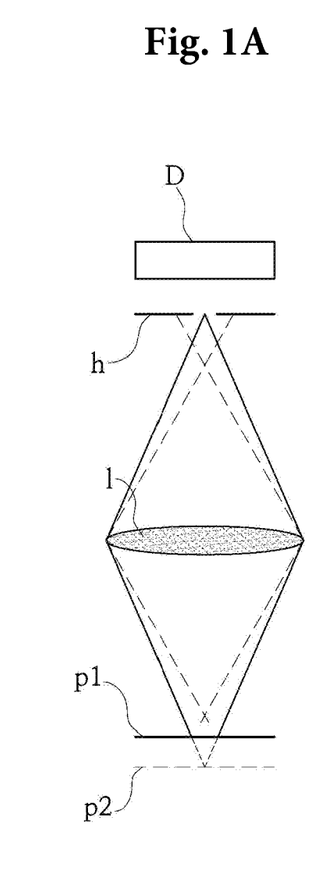
FIGS. 1A-1C are views illustrating a general confocal principle in the related art.
Figures 1B, 1C:
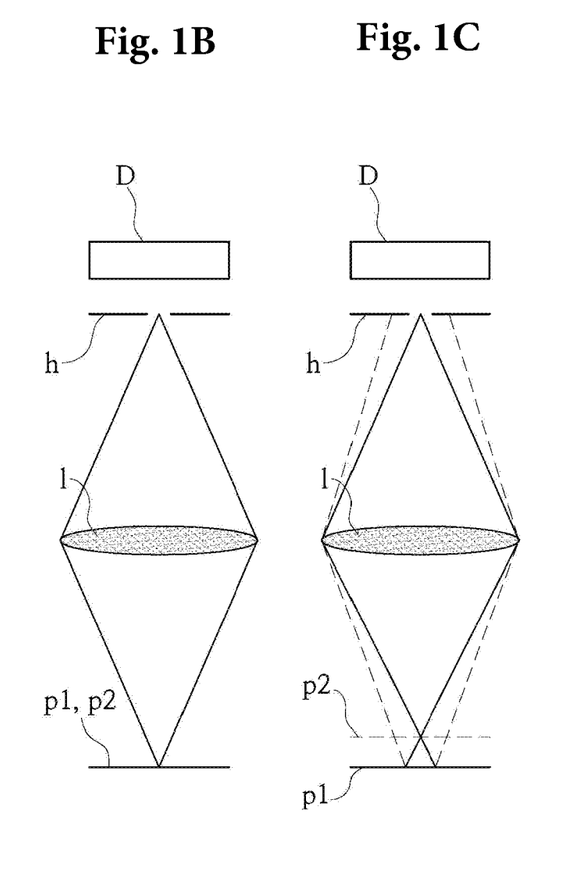

FIGS. 1A-1C are views illustrating a general confocal principle in the related art. Referring to FIG. 1A and FIG. 1C, since the object surface p1 is displaced from the focus plane p2, only a part of the beam passing through a lens 1 after reflecting off the object surface passes through the pin hole h to be detected by a photodetector D. On the other hand, referring to FIG. 1B, since the object surface p1 coincides with the focus plane p2, the entire of the beam passing through the lens 1 after reflecting off the object surface passes through the pin hole h to be detected by the photodetector D.

Accordingly, when the light source is moved up and down, a beam that passes through the pin hole to be detected by the photodetector may be implemented as an image. That is, according to the imaging method using the confocal principle, the light focused on a specific part of an object can be selectively obtained using the pin hole, thereby acquiring a high resolution image.

In order to acquire a tomographic image in the depth direction, the imaging method using the confocal principle must scan the entire object while moving the focus position of the light source up and down. However, moving the focus position of the light source up and down has a problem that it takes much time to realize a tomographic image.

DISCLOSURE

Technical Problem

The present invention has been made keeping in mind the above problems occurring in the related art, and the present invention has an objective to provide a confocal imaging apparatus using a chromatic aberration lens that implements a tomographic image at a high speed by enabling an entire object to be scanned at a high speed without moving a light source.

Technical Solution

In order to achieve the objective of the present invention, the present invention provides a confocal imaging apparatus using a chromatic aberration lens, including: a light source unit emitting light; a splitter transmitting or reflecting the light emitted from the light source unit; a pin hole disposed between one side of the splitter and an object; a chromatic aberration lens disposed between the pinhole and the object to generate chromatic aberration so that light guided from one side of the splitter to the pin hole is focused at respective different positions of the object; and a detection unit disposed at the other side of the splitter to collect image information at respective different focuses corresponding to wavelengths of light guided from the object to the other side of the splitter.

In addition, the light source unit may be configured to emit light having multiple wavelengths.

In addition, the chromatic aberration lens may include a spherical lens or a GRIN lens.

In addition, the detection unit may include a light splitting unit splitting and arranging light guided by the splitter for each wavelength; and a light receiving unit collecting the light split by the light splitting unit as image information.

In addition, the light splitting unit may include a prism, a grating or a dichroic filter.

In addition, the light receiving unit may include a complementary metal oxide semiconductor (CMOS) or a charge coupled device (CCD), and the CMOS or the CCD may collect pixel information corresponding to wavelengths of the light as image information In addition, an image implementing unit may include the pin hole and the chromatic aberration lens, and the confocal imaging apparatus using the chromatic aberration lens may further include a first lens provided between one side of the spiller and the image implementing unit, or a second lens provided between the other side of the splitter and the detection unit.

In addition, an image implementing unit may include the pin hole and the chromatic aberration lens, and the image implementing unit may be positioned on a same line as a traveling direction of the light emitted by the light source unit.

In addition, the confocal imaging apparatus using the chromatic aberration lens may further include a controller generating a three-dimensional image by combining the image information at the respective different focuses collected by the detection unit.

In addition, the confocal imaging apparatus using the chromatic aberration lens may further include a storage unit storing depth information according to wavelengths of light, wherein the controller generates, as the three-dimensional image, the image information at the respective different focuses corresponding to the respective different wavelengths of lights collected by the detection unit using the depth information according to wavelengths of the light stored in the storage unit.

In addition, the confocal imaging apparatus using the chromatic aberration lens may further include a corrector linearly correcting the depth information according to wavelengths of light stored in the storage unit, wherein the controller generates the three-dimensional image using the depth information according to wavelengths of the light corrected by the corrector.

Advantageous Effects

Since the present invention is configured to generate a three-dimensional image using multiple tomographic images by a chromatic aberration lens without moving the light source or the object up and down, there is an effect of remarkably shortening the time it takes to implement the multiple tomographic images.

Further, since the chromatic aberration lens is relatively inexpensive and a separate structure for moving the light source or the object is not required, the confocal imaging apparatus according to the present invention has effects that the manufacturing cost thereof can be greatly reduced and the imaging apparatus can be manufactured in a simple and compact configuration.

DESCRIPTION OF REFERENCE NUMERALS IN DRAWINGS

10: confocal imaging apparatus using chromatic aberration lens
100: light source unit 200: splitter
210: reflection unit 300: first lens
310: second lens 400: image implementing unit
410: pin hole 420: chromatic aberration lens
500: detection unit 520: light splitting unit
520: light receiving unit 600: control unit
610: controller 620: storage unit
630: corrector 700: image output unit

BEST MODE

Hereinafter, a confocal imaging apparatus using a chromatic aberration lens according to a preferred embodiment of the present invention will be described in detail with reference to the accompanying drawings.

Figure 2:
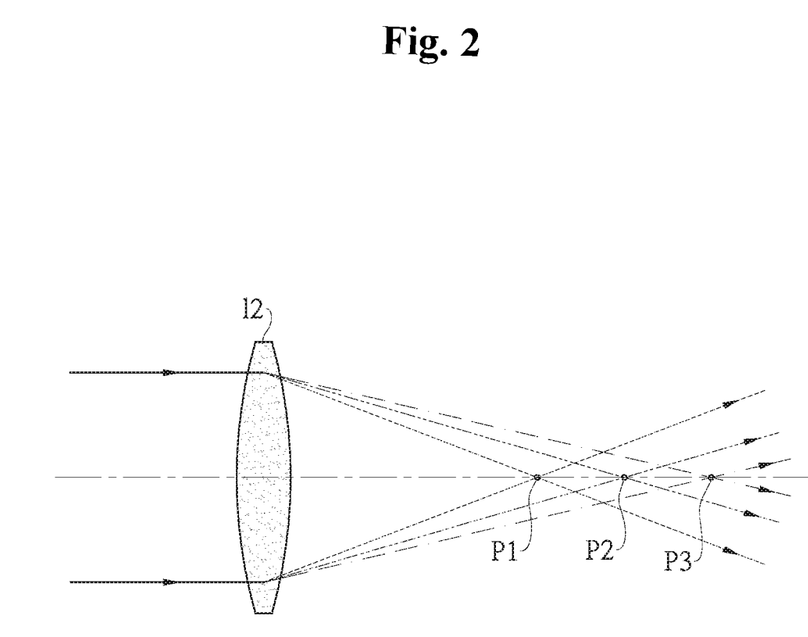
FIG. 2 is a view illustrating a state in which a focus is generated for each wavelength at respective different positions by a general chromatic aberration lens.

FIG. 2 is a view illustrating a state in which a focus is generated for each wavelength at respective different positions by a general chromatic aberration lens.

Referring to FIG. 2, chromatic aberration is caused by a difference in diffraction ratios according to different wavelengths when light passes through a lens 12, in which all wavelengths are not exactly focused on the focal plane due to a difference in refractive indexes of light, so that focuses P1, P2, and P3 are formed for each wavelength at respective different positions. For example, the spectrum of visible light has various wavelengths of light ranging from red to violet, and thus the refractive indexes of light are also different from each other depending on the various wavelengths. As described above, when the light passing through the lens 12 is differently focused for each wavelength at the respective different positions, information on each depth of the object is obtained for each wavelength of the reflected light. The present invention is configured to acquire a confocal image at each depth of the object using such chromatic aberration.

Figure 3:
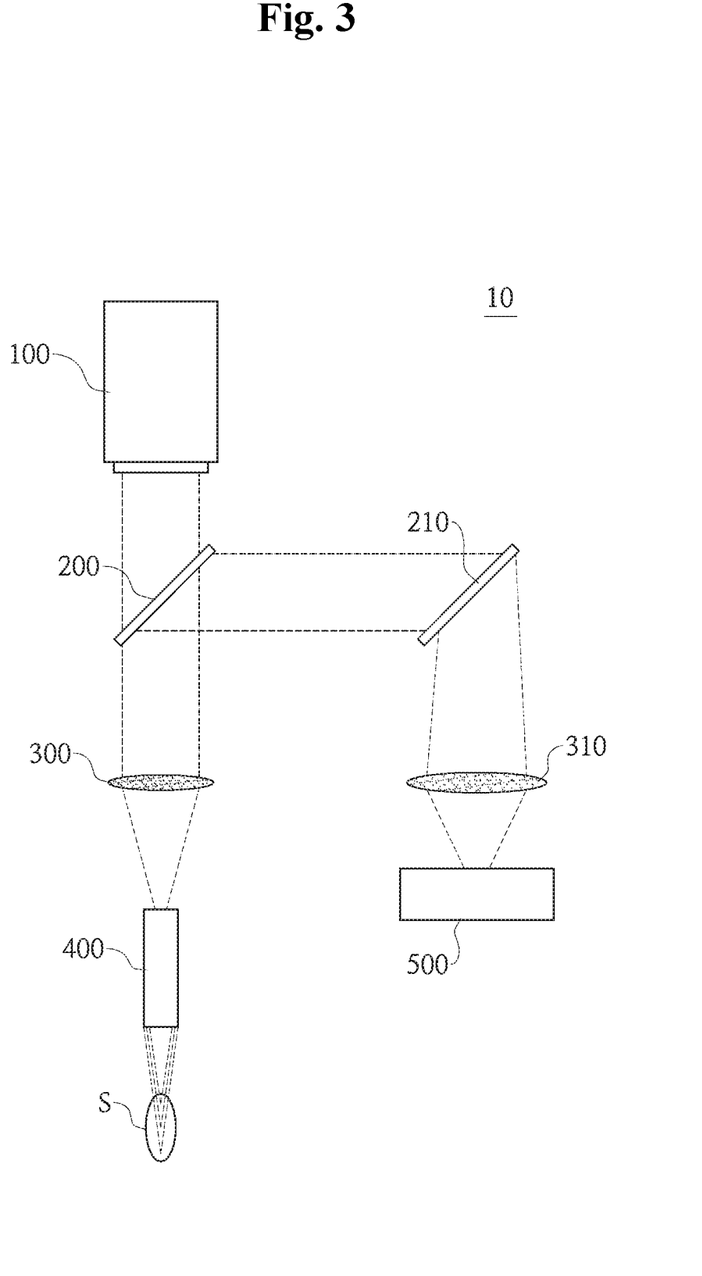
FIG. 3 is a schematic view illustrating a confocal imaging apparatus using a chromatic aberration lens according to a preferred embodiment of the present invention.
Figure 4:
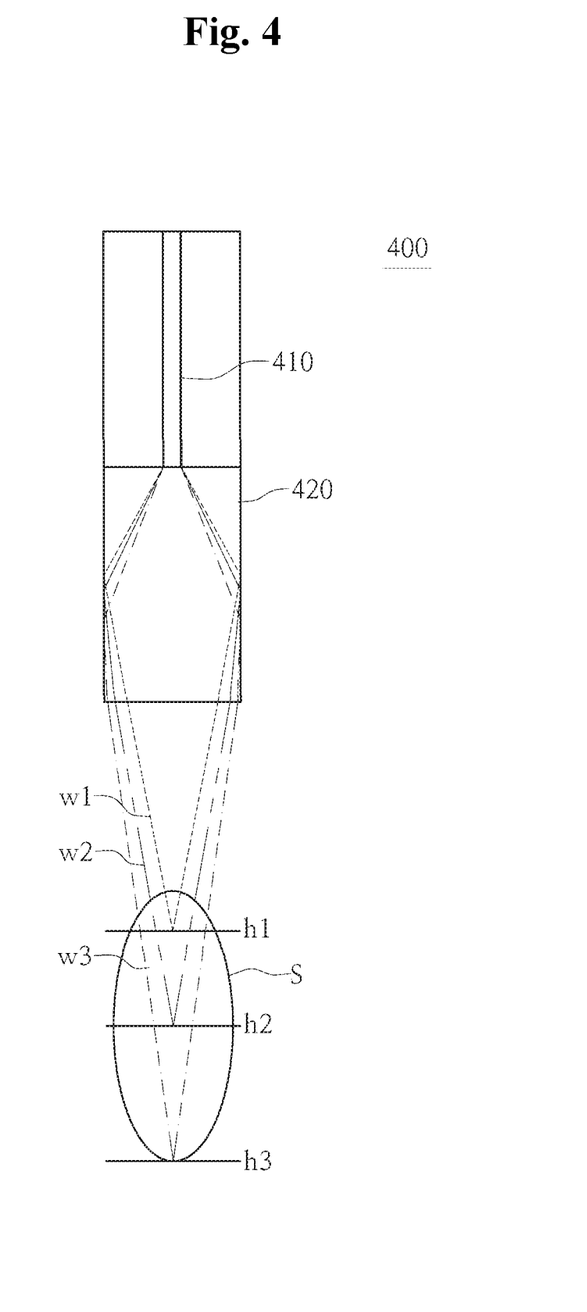
FIG. 4 is a schematic view illustrating a state in which light passing through a chromatic aberration lens is focused at different positions due to a difference in diffraction index depending on wavelengths in a confocal imaging apparatus using a chromatic aberration lens according to a preferred embodiment of the present invention.

FIG. 3 is a schematic view illustrating a confocal imaging apparatus using a chromatic aberration lens according to a preferred embodiment of the present invention, and FIG. 4 is a schematic view illustrating a state in which light passing through a chromatic aberration lens is focused at different positions due to a difference in diffraction index depending on wavelengths in a confocal imaging apparatus using a chromatic aberration lens according to a preferred embodiment of the present invention.

Figure 5:
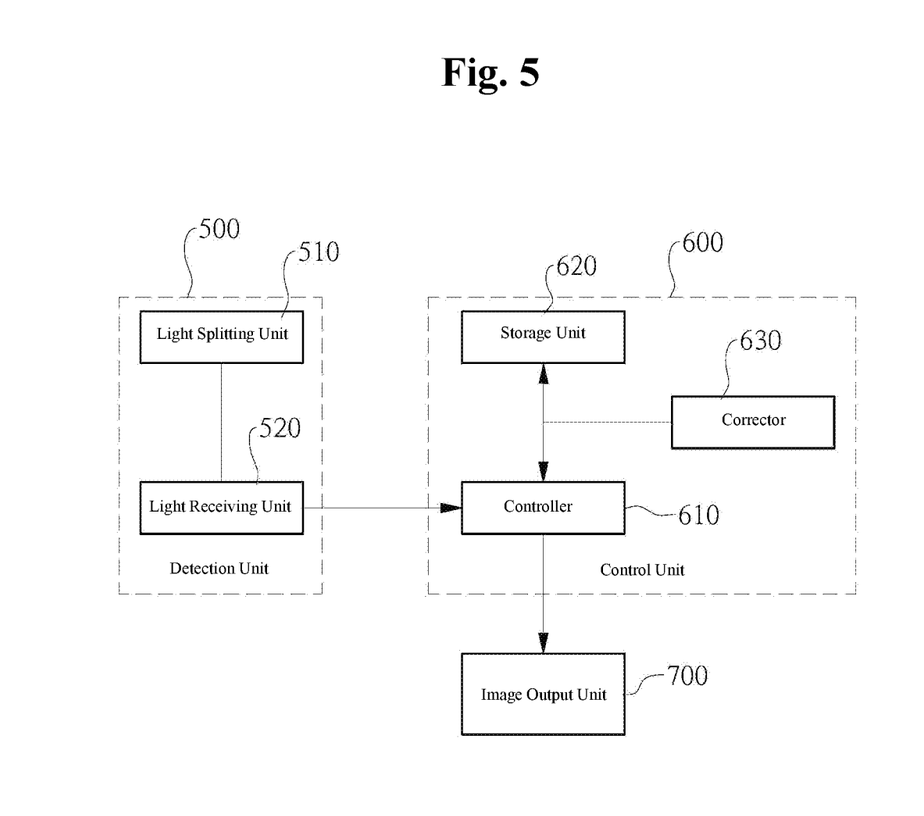
FIG. 5 is a schematic view illustrating a detection unit and a control unit of a confocal imaging apparatus using a chromatic aberration lens according to a preferred embodiment of the present invention.

First, referring to FIG. 3, a confocal imaging apparatus 10 using a chromatic aberration lens according to a preferred embodiment of the present invention includes a light source unit 100, a splitter 200, a first lens 300, an image implementing unit 400, a reflection unit 210, a second lens 310, a detection unit 500, a control unit 600 (shown in FIG. 5), and an image output unit 700 (shown in FIG. 5).

The light source unit 100 is configured to emit light in which light rays having different wavelengths are mixed, for example, to emit a mixture of different wavelengths such as white light. In addition, the light source unit 100 may selectively mix and emit light rays of wavelengths that a user desires.

The splitter 200 serves to transmit or reflect light emitted from the light source unit 100, and is configured with a general beam splitter. The splitter 200 is positioned in a traveling direction of light emitted by the light source unit 100 and transmits light emitted from the light source unit 100 in one side direction of the splitter 200. Further, the splitter 200 reflects the light reflected from the object S, which will be described later, in the other side direction of the splitter 200. Hereinafter, the one side direction of the splitter 200 or one side of the splitter 200 refers to as the same direction as the traveling direction of the light emitted by the light source unit 100, and the other direction of the splitter 200 or the other side of the splitter 200 refers to as the direction perpendicular to the travelling direction of light emitted by the light source unit 100.

The first lens 300 is disposed between one side of the splitter 200 and the image implementing unit 400 so as to condense the light transmitted to the splitter 200 onto the image implementing unit 400, and is configured with, for example, convex lens and the like.

The image implementing unit 400 includes a pin hole 410 and a chromatic aberration lens 420. The pin hole 410 is to use the confocal principle. The light passing through the first lens 300 is irradiated on the chromatic aberration lens 420 in a state where the noise is removed while passing through the pin hole 410, thereby obtaining image of high resolution.

The chromatic aberration lens 420 is a lens in which chromatic aberration is generated and intends to generate an axial chromatic aberration in order to measure a longitudinal tomography of the object S. That is, as described above, since the refractive index varies depending on wavelengths of the light, the chromatic aberration is generated using the difference in refractive index according to multiple wavelengths of light emitted from the light source unit 100. The chromatic aberration lens 420 may be configured with a spherical lens, a gradient-index rod lens (GRIN) lens, or the like. The spherical lens is a lens of which a radius of curvature is constant, in which only light rays very close to the optical axis are imaged at one point, and light rays passing through edges of the lens are not imaged at one point, thereby having an aberration. The GRIN lens is a lens in which the distance from the plane position and the cross section to the focus changes periodically with respect to the length of the lens. Since the chromatic aberration lens 420 is relatively inexpensive, there is an effect that the manufacturing cost of the imaging apparatus can be greatly reduced. Further, since it is not necessary to move the focal position of the light source unit 100 up and down, there is an effect that the measurement speed is improved.

Herein, referring to FIG. 4, the light passing through the chromatic aberration lens 420 is focused at different positions of the object S due to the difference in diffraction ratios depending on different wavelengths. For example, a portion h1 which is a upper portion of the object S in a height is such that blue light having a relatively short wavelength w1 is reflected from the object S, and a portion h2 which is a lower portion of the object S in height is such that red light having a long wavelength w2 is reflected by the object S, and a portion h3 which is a middle portion of the object S in height is such that green light having a middle wavelength w3 which is longer than the blue light and shorter than the red light is reflected by the object S.

Subsequently, referring to FIG. 3 back, the light reflected by the object S is reflected by the splitter 200 after passing through the chromatic aberration lens 420, the pinhole 410, and the first lens 300, and then is incident on the reflection unit 210 located on the other side of the splitter 200 in a state which a path of the light is changed. The reflection unit 210 is located on the other side of the splitter 200 to cause the light guided in the other side of the splitter 200 to be reflected into the detection unit 500. Herein, a second lens 310 may be provided between the reflection unit 210 and the detection unit 500.

Figure 6:
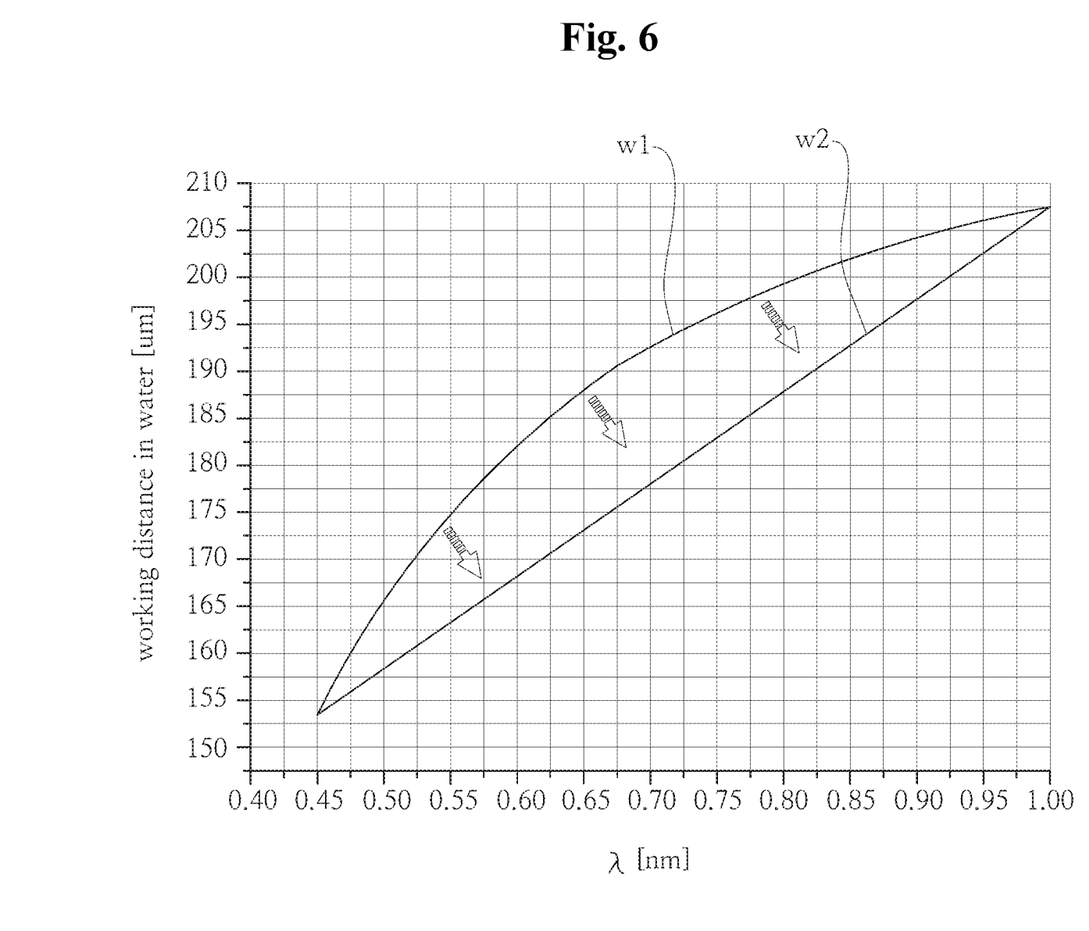
FIG. 6 is a schematic view illustrating a state in which a corrector linearly corrects depth information according to a wavelength of light in a confocal imaging apparatus using a chromatic aberration lens according to a preferred embodiment of the present invention.
Figure 7:
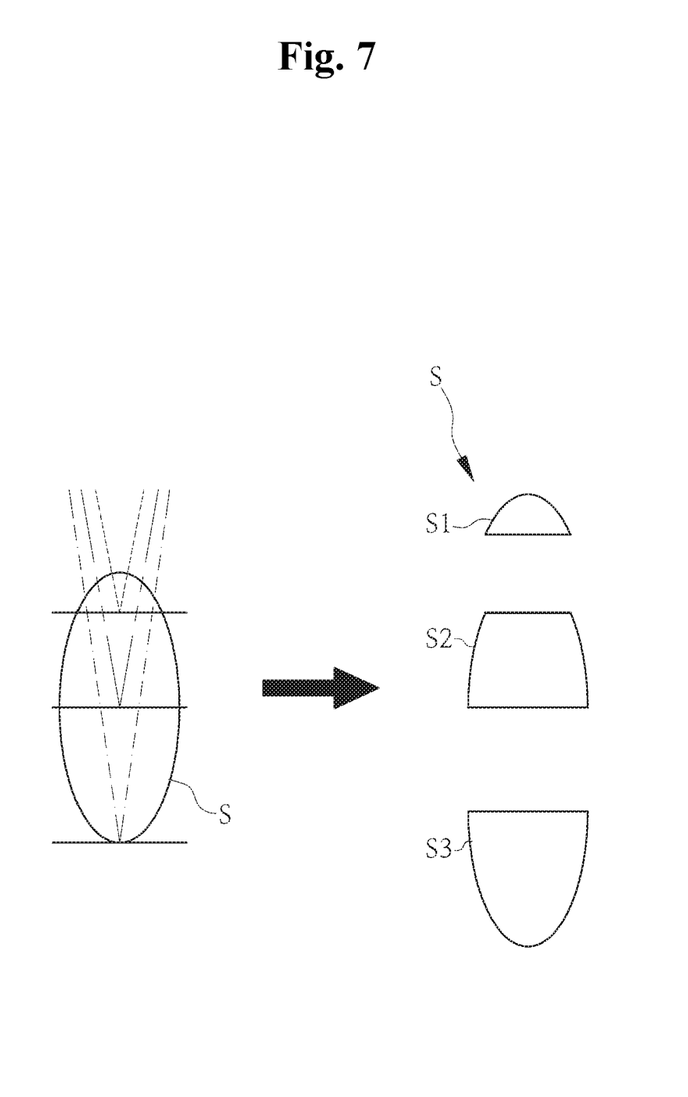
FIG. 7 is a schematic view illustrating a procedure in which a control unit generates tomographic images at respective different focuses corresponding to wavelengths of light as three-dimensional images, in a confocal imaging apparatus using a chromatic aberration lens according to a preferred embodiment of the present invention.

FIG. 5 is a schematic view illustrating a detection unit and a control unit of a confocal imaging apparatus using a chromatic aberration lens according to a preferred embodiment of the present invention, FIG. 6 is a schematic view illustrating a state in which a corrector linearly corrects depth information according to a wavelength of light in a confocal imaging apparatus using a chromatic aberration lens according to a preferred embodiment of the present invention, and FIG. 7 is a schematic view illustrating a procedure in which a control unit generates tomographic images at respective different focuses corresponding to wavelengths of light as three-dimensional images, in a confocal imaging apparatus using a chromatic aberration lens according to a preferred embodiment of the present invention.

First, referring to FIGS. 5 and 6, the detection unit 500 includes a light splitting unit 510 and a light receiving unit 520. The light splitting unit 510 is configured to split and arrange the light passing through the second lens 310 for each wavelength. The light splitting unit 510 may split and arrange the light passing through the second lens 310 for each wavelength by using, for example, a prism, a grating, or a dichroic filter.

The light receiving unit 520 receives the light emitted from the light splitting unit 510 and collects the light split by the light splitting unit 510 as image information. The light receiving unit 520 may include, for example, a complementary oxide semiconductor (CMOS) or a charge coupled device (CCD). The CMOS or the CCD collects pixel information corresponding to wavelengths of light as image information. The light receiving unit 520 provides the collected image information to the control unit 610, which will be described later.

The control unit 600 includes a storage unit 620, a controller 610, and a corrector 630. The storage unit 620 has depth information according to wavelengths of light stored in advance as a spectral waveform. That is, the relationship between the wavelength of light and displacement of the object S is obtained through simulation in advance. The storage unit 620 and the corrector 630, which will be described later, may be configured to be included in the controller 610.

The controller 610 analyzes the image information of the respective different wavelengths received from the light receiving unit 520 and generates an image. Here, the controller 610 generates image information at the respective different focuses corresponding to wavelengths of the respective different lights collected by the detection unit 500 as a three-dimensional image, by using the depth information according to wavelengths of the light stored in the storage unit 620.

Meanwhile, the depth information according to wavelengths of the light stored in the storage unit 620 may be distorted into a round shape w1. In this case, as shown in FIG. 6, linearization process is performed by using the corrector 630 having a linear algorithm, in which the distorted depth information of a round type w1 according to wavelengths of the light is corroded into a linear type w2. Then, the controller 610 may generate a more accurate three-dimensional image by using the depth information according to wavelengths of the light linearly corrected by the corrector 630.

Then, the three-dimensional image generated by the controller 610 is output to the image output unit 700. Herein, as shown in FIG. 7, the controller 610 collects multiple tomographic images S1, S2, and S3 of the object S that are focused at the respective different positions according to wavelengths of the light source in order by using the depth information according to wavelengths of the light, thereby generating the three-dimensional image.

The image output unit 700 includes a monitor or the like and outputs the three-dimensional image of the object S generated by the controller 610 to the outside.

As described above, since the present invention is configured to generate a three-dimensional image using multiple tomographic images by the chromatic aberration lens without moving the light source unit or the object up and down, there is an effect of remarkably shortening the time it takes to implement the multiple tomographic images.

In addition, since the chromatic aberration lens is relatively inexpensive and a separate structure for moving the light source or the object is not required, the confocal imaging apparatus according to the present invention has effects that the manufacturing cost thereof can be greatly reduced and the imaging apparatus can be manufactured in a simple and compact configuration.

The invention claimed is:

1. A confocal imaging apparatus using a chromatic aberration lens, the apparatus comprising:
a light source unit configured to emit light;
a splitter configured to
transmit the light emitted from the light source unit, toward a first direction, and
reflect the light emitted from the light source unit, toward a second direction;
an image implementing unit having an integral unibody including a pin hole and a chromatic aberration lens that directly contacts with a first side of the pin hole,
wherein the image implementing unit is
disposed between the splitter and an object, on a same straight line as a traveling direction of the light emitted by the light source unit toward the splitter, and
configured to receive light, which is transmitted by the splitter toward the first direction, and
wherein the chromatic aberration lens is disposed between the first side of the pinhole and the object, and configured to generate chromatic aberration so that light guided from the splitter to the first side of the pin hole is focused at respective different positions of the object; and
a detection unit configured to receive light, which is reflected by the splitter toward the second direction, and collect image information at respective different focuses corresponding to wavelengths of the light received by the detection unit.

2. The apparatus of claim 1, wherein the light source unit is configured to emit light having multiple wavelengths.

3. The apparatus of claim 1, wherein the chromatic aberration lens includes a spherical lens or a GRIN lens.

4. The apparatus of claim 1, wherein the detection unit includes:
a light splitting unit splitting and arranging light received by the detection unit for each wavelength; and
a light receiving unit collecting the light received by the detection unit as image information.

5. The apparatus of claim 4, wherein the light splitting unit includes a prism, a grating or a dichroic filter.

6. The apparatus of claim 4, wherein the light receiving unit includes a complementary metal oxide semiconductor (CMOS) or a charge coupled device (CCD), and
the CMOS or the CCD collects pixel information corresponding to wavelengths of the light received by the detection unit as image information.

7. The apparatus of claim 1,
further comprising:
a first lens provided between the splitter and the image implementing unit and configured to receive the light, which is transmitted by the splitter toward the first direction; and
a second lens
provided between the detection unit and a reflection unit configured to reflect the light, which is reflected by the splitter toward the second direction, and
configured to receive light, which is reflected by the reflection unit.

8. The apparatus of claim 1, further comprising:
a controller generating a three-dimensional image by combining the image information at the respective different focuses collected by the detection unit.

9. The apparatus of claim 8, further comprising:
a storage unit storing depth information according to wavelengths of light,
wherein the controller generates, as the three-dimensional image, the image information at the respective different focuses corresponding to the respective different wavelengths of lights collected by the detection unit using the depth information according to wavelengths of the light stored in the storage unit.

10. The apparatus of claim 9, further comprising:
a corrector linearly correcting the depth information according to wavelengths of light stored in the storage unit,
wherein the controller generates the three-dimensional image using the depth information according to wavelengths of the light corrected by the corrector.

* * * * *